United States Patent [19]
Danner et al.

[11] 3,920,406
[45] Nov. 18, 1975

[54] PROCESS FOR THE PREPARATION OF ALUMINIUM HYDROXY HALIDE POWDERS

[75] Inventors: Max Danner; Martin Krieg, both of Gersthofen; Klaus Matschke, Burgkirchen, Alz, all of Germany

[73] Assignee: Hoechst Aktiengesellschaft, Frankford am Main, Germany

[22] Filed: Dec. 19, 1973

[21] Appl. No.: 426,309

[30] Foreign Application Priority Data
Dec. 3, 1972 Germany............................ 2263333

[52] U.S. Cl................. 23/293 A; 423/462; 424/68; 159/48 R
[51] Int. Cl.[2]....................... C01F 7/48; B01D 1/18
[58] Field of Search...... 423/122, 495, 462; 424/68; 23/313 R, 293 A, 293 R; 159/48 R, 4 R; 264/117

[56] References Cited
UNITED STATES PATENTS
2,955,983   10/1960   Messina............................. 424/68

FOREIGN PATENTS OR APPLICATIONS
2,152,509   6/1972   Germany............................. 23/293

OTHER PUBLICATIONS
Gardiner et al., Fiat Final Report No. 788, Apr. 3, 1946, pp. 1 to 11.

Primary Examiner—Norman Yudkoff
Assistant Examiner—S. J. Emergy
Attorney, Agent, or Firm—Connolly and Hutz

[57] ABSTRACT

For the working up of aqueous aluminium hydroxy chloride or bromide solutions to powdery, colourless clear water-soluble products the process of the spray drying by means of drying gas introduced in parallel flow is suitable, if the following conditions are adhered to: temperature of the drying gas at the dryer entrance 205° to 500°C, relative moisture of the gas leaving the dryer 20 to 40 %.

2 Claims, No Drawings

PROCESS FOR THE PREPARATION OF ALUMINIUM HYDROXY HALIDE POWDERS

The present invention concerns a process for the preparation of aluminium hydroxy halide powders.

Basic aluminium halides are being used increasingly in the cosmetic industry in the form of anti-perspirants, shaving lotions and medicinal cosmetic preparations. The aluminium salts are preferably processed in the form of powders.

The basic aluminium halides are obtained in the various processes of preparation at first as aqueous solution (for example, German Patent Specification 1,174,751). The solutions are then evaporated in general by making into scales on drum dryers, which process should be carried out under mild conditions in order to avoid further, partly irreversible, splitting off of water from the basic salts, since the solubility and colour are thereby impaired. The scaled aluminium hydroxy halides are subsequently worked up in a second process by grinding into powders of the desired fineness.

It has also been suggested to work up aluminium hydroxy halide solutions in spray dryers (for example German Offenlegungsschrift 2,152,509). Products which are very different in quality and colour are obtained; the conditions of work must be laid down empirically.

It has now been found that powders with the desired chemical and physical properties are obtained in always the same quality from aqueous solutions of basic aluminium halides simply and in one single process step, when operating in a spray dryer, under definite conditions concerning the water available during drying.

The present invention, therefore, provides a process for the preparation of colourless, water-soluble aluminium hydroxy chloride or bromide powders of the formula $Al_2(OH)_nX_z$, wherein X is the halogen, n represents a number between 3.0 and 5.1 and z represents a number between 3.0 and 0.9, and the sum $n + z$ is always equal to 6, from aqueous solutions of basic aluminium chlorides or bromides with an atomic ratio of $Al : X = 0.66 : 1$ to $2.2 : 1$, preferably $1.9 : 1$ to $2.1 : 1$, wherein 20 to 50 percent by weight aluminium salt solutions are sprayed into a spray dryer, and the drying gas introduced in parallel flow is kept at the dryer entrance at a temperature of 205° to 500°C and at the dryer outlet the relative moisture is adjusted at 20 to 40%.

It was surprising and not to be foreseen that, for drying in the spray dryer careful adherence to narrow temperature limits is not important as in the case of the drying on drum dryers, but the quality of the end product depends here exclusively on the moisture conditions prevailing within the dryer. According to the method of the invention taking into account this fact it is, therefore, possible to prepare aluminium hydroxy halides under optimum conditions and, therefore, in optimum quality.

The products differ from those obtained by known processes in that they are always colourless and form a clear solution in water, further, by their higher apparent density and the slighter tendency to forming dust. The spherical shape of the single particles and the favourable grain spectrum prove especially advantageous in the preparation of cosmetic mixtures since these preparations have a remarkably low viscosity in comparison to those which have been prepared from products dried on drums.

The aqueous solutions of aluminium hydroxy chlorides or bromides to be worked up according to the invention are prepared according to known processes, for example that described in the German patent specification 1,174,751. They should contain 20 to 50 % by weight of the salt, in which aluminium and halogen are present in the atomic ratio of $0.66 : 1$ to $2.2 : 1$, preferably $1.9 : 1$ to $2.1 : 1$. This ratio is almost unaltered in the dried powder. The process is carried out in such a way that the aqueous aluminium salt solution is sprayed into a gas stream blown through a spraying dryer via two-substance nozzles or perforated discs with corresponding speed of rotation and number of apertures. Suitable two-substance nozzles are, for example those, which are operated with a bore of 3 mm with an air pressure of 10 atmospheres.

The dryer is fed with hot gases, preferably with hot air. Gas temperatures of admission of from 205° to 500°, especially from 290° to 350°C, have proved successful. The process is especially economical if combustion gases are available for the heating of the drying gas.

For the success of the process it is essential that before leaving the spray dryer the product is always in contact with an atmosphere the relative moisture of which is in the region of between 20 and 40 %. The temperature, at the dryer exit, of the gas-solid mixture leaving the dryer should be preferably 50° to 150°C. This is achieved by fixing the ratio of drying-gas to the quantity of salt solution (ie. to the water quantity contained in the solution) per time unit by using the formula for calculating the relative air moisture, according to which the following apply:

1. relative moisture of the waste gas (%) =

$$\frac{\text{gram water/m}^3 \text{waste gas} \cdot 100}{\text{gram water at saturation/m}^3 \text{ waste gas}}$$

For the calculation the following formula is more suitable:

$$\text{relative moisture of the waste gas } (\%) = \frac{P}{P_s} \cdot \frac{x \cdot 100}{x + 0.622}$$

in which
 $x$ = water content in kg/kg dry air
 $P$ = total pressure of the system
 $P_s$ = saturation pressure of the steam at the temperature of the waste gas.

However, also a part of the moisture necessary can be added to the system in the form of moistened drying gas (for example, by blowing in steam). The dosing in of steam is especially advantageous for setting the relative outgoing air moisture.

For example, the necessary quantity of drying gas with a certain temperature can be easily determined by calculation with a waste gas temperature given in advance and relative moisture of the waste gas given in advance for a desired throughput of salt solution, whereby the quantity of water necessary for the saturation is to be taken from relevant tables. A relation for the remaining values results from the heat economy valid for the dryer:

2. $Q_1 = Q_n + Q_2 + Q_3$ in which
- $Q_1$ represents the quantity of heat which is contained in the drying gas
- $Q_n$ represents losses of heat by radiation,
- $Q_2$ represents the quantity of heat contained in the waste gas
- $Q_3$ represents the evaporation heat for the quantity of evaporated water In the equation $Q_1$ or $Q_2$ may be replaced by the products $M \delta \cdot T_1$ or $M \delta \cdot T_2$ wherein M represents the mass and $\delta$ the specific heat of the drying gas; $T_1$ and $T_2$ are the respective temperatures. $Q_n$ is a characteristic constant to be determined for the dryer (only dependent on the temperature conditions chosen in the dryer), $Q_3$ is the total quantity of heat for evaporating the sprayed water calculated from the known evaporation heat of water.

In the first approximation, for example, from M (the drying gas quantity calculated according to formula I) the temperature $T_1$ wanted is obtained from the relation $$M \delta (T_1 - T_2) = Q_n + Q_3$$

to $$T_1 = T_2 + \frac{Q_n + Q_3}{M \cdot \delta}$$

The products obtained which have the advantageous properties given above are used preferably in the field of cosmetics in aqueous or alcoholic preparations or in dry sprays. They can be characterized by the formula $Al_2(OH)_nX_z$, wherein X is chlorine or bromine, n represents a number between 3.0 and 5.1 and z represents a number between 3.0 and 0.9, and $n + z = 6$. This formula represents a simplification in so far that the basic aluminium halides probably constitute polymeric compounds. The compounds contain, furthermore, a variable number of water molecules which are bound in complex manner or as water of crystallization.

The following examples illustrate the invention.

EXAMPLE 1

An atomizing tower, consisting of a cylindrical part 4 m in length and 1.6 m in diameter and a conical part 2 m in length was used as dryer. As drying gas air was used. The salt solution to be sprayed was fed in by means of a pump to a 2-substance-atomizing nozzle or a rotating perforated disc. The product bore of the 2-substance nozzle was 3 mm, the atomizing air pressure 10 atmospheres. The perforated disc of titanium had a diameter of 300 mm and a speed of 18,000 revolutions/minute. 136 kg of 50 % by weight aqueous solution (25°C) of aluminium hydroxy chloride (Al:Cl — atomic ratio 2:1) were sprayed hourly through the 2-substance nozzle at a spraying air pressure of 10 atmospheres. As drying gas 720 $Nm^3$ air/h were blown through the dryer in parallel flow. At the tower entrance the drying gas had a temperature of 320°C and a water content of <1 $g/m^3$.

The drying gas left the tower together with the sprayed product at a temperature of 80°C and a moisture content of 75.8 g of $H_2O$/kg, from which a relative moisture of 23 % is calculated. The product was separated in a cyclone.

The basic Al-chloride obtained was colourless and clearly water-soluble. The Cl-content was 16.8 %, corresponding to a composition of $Al_2(OH)_5Cl \cdot 3 H_2O$.

EXAMPLES 2 to 10

In the apparatus described in Example 1, 50 % by weight of aqueous solutions of aluminium hydroxy chloride (or bromide in Example 10) were worked up to powders. The working conditions and the results are summarized in the following table. From the comparitive examples 2 to 4 it can be seen that the products of the process are not satisfactory if the relative moisture of the waste gas is outside the limits required. The barometer reading was 760 torr.

| Ex. | Throughput of Al-salt solution 50% by weight (kg/h) | Quantity ($m^3$/h) | Temp. entrance (°C) | Temp. outlet (°C) | Dry gas (air) g $H_2O$/kg drying gas at entrance | g $H_2O$/kg drying gas at exit | rel. moisture exit (%) | halogen content (%) | Properties of the dried product water content m according to $Al_2(OH)_5$ X.m $H_2O$ | colour | aqueous solution[6] |
|---|---|---|---|---|---|---|---|---|---|---|---|
| 2 | 58[1)3)] | 720 | 220 | 100 | 1 | 32,2 | 5 | 17,5 | 1,5 | yellow | largely insoluble |
| 3 | 72[1)3)] | 720 | 280 | 95 | 1 | 40 | 7,5 | 17,4 | 1,5 | yellow | strong deposit |
| 4 | 69[1)4)] | 720 | 220 | 77 | 1 | 38,4 | 14 | 17,3 | 1,6 | yellowish | weak deposit |
| 5 | 44[1)3)] | 554 | 210 | 100 | 124[5)] | 155 | 20 | 16,7 | 2,1 | colourless | clear |
| 6 | 52[1)3)] | 553 | 209 | 96 | 124[5)] | 161 | 24 | 16,2 | 2,5 | colourless | clear |
| 7 | 61[1)4)] | 570 | 210 | 102 | 227[5)] | 270 | 28 | 16,2 | 2,5 | colourless | clear |
| 8 | 74[1)4)] | 680 | 210 | 70 | 43,5[5)] | 87 | 40 | 16,0 | 2,6 | colourless | clear |
| 9 | 92[1)3)] | 720 | 210 | 60 | 1 | 51 | 39 | 15,9 | 2,7 | colourless | clear |
| 10 | 92[2)3)] | 720 | 210 | 60 | 1 | 51 | 39 | 30,5 | 2,4 | almost colourless | clear |

[1)]chloride
[2)]bromide
[3)]2-substance-nozzle
[4)]perforated disc
[5)]steam was added to the drying gas
[6)]10 g product in 50 ml of water of 20°C.

What is claimed is:

1. Process for the preparation of colourless, water-soluble aluminium hydroxy chloride or bromide powders of the formula $Al_2(OH)_nX_z$, wherein X is the halogen, n represents a number between 3.0 and 5.1, and the sum $n + z$ is always equal to 6, from the aqueous 20 to 50 by weight % solutions of basic aluminium chlorides and bromides with an atomic ratio of Al : X = 0.66 : 1 to 2.2 : 1, wherein aluminium salt solutions are sprayed in a spraying dryer, in which the drying gas is introduced in parallel flow and has a temperature of 290° to 500°C at the dryer entrance and wherein the ratio of the rate of the drying gas and the rate of water, contained in the aqueous aluminium salt solution and the inlet gas, is chosen in such way that the off gas of the dryer has a relative humidity in the range of 20 to 40% and the outlet temperatures are between 50° and 150°C.

2. Process for the preparation of colourless, water-soluble aluminium hydroxy chloride or bromide powders of the formula $Al_2(OH)_nX_z$, wherein X is the halogen, $n$ represents a number between 3.0 and 5.1, and the sum $n + z$ is always equal to 6, from the aqueous 20 to 50% by weight solutions of basic aluminium chlorides and bromides with an atomic ratio of $Al : X = 0.66 : 1$ to $2.2 : 1$, wherein aluminium salt solutions are sprayed in a spraying dryer under conditions that the expression $$\frac{P}{P_s} \cdot \frac{x \cdot 100}{x+0.622}$$

is 20–40, in which expression $P$ = absolute pressure of the outlet gas
$P_s$ = saturation pressure of water at the temperature of the outlet gas
$x$ = amount of water in outlet gas [kg/kg of dry air]

which $$= \frac{\text{rate of added (evaporated) water [kg/min]}}{\text{rate of inlet air [kg/min]}}$$

and the inlet dry gas has a temperature of 290° to 500°C., and the outlet gas temperature is between 50° and 150°C.

* * * * *